(12) United States Patent
Tokuyama et al.

(10) Patent No.: US 9,994,285 B2
(45) Date of Patent: Jun. 12, 2018

(54) MULTIPLE BICYCLE SPROCKET ASSEMBLY

(71) Applicant: Shimano Inc., Sakai, Osaka (JP)

(72) Inventors: Koji Tokuyama, Osaka (JP); Takahiko Umezawa, Osaka (JP)

(73) Assignee: Shimano Inc., Osaka (JP)

( * ) Notice: Subject to any disclaimer, the term of this patent is extended or adjusted under 35 U.S.C. 154(b) by 248 days.

(21) Appl. No.: 15/183,301

(22) Filed: Jun. 15, 2016

(65) Prior Publication Data

US 2017/0361901 A1    Dec. 21, 2017

(51) Int. Cl.
*B62M 9/10* (2006.01)
*F16H 55/30* (2006.01)

(52) U.S. Cl.
CPC ............. *B62M 9/10* (2013.01); *F16H 55/303* (2013.01)

(58) Field of Classification Search
CPC ......... B62M 9/10; B62M 9/12; F16H 55/303; F16H 7/06
USPC ........................................................ 474/160
See application file for complete search history.

(56) References Cited

U.S. PATENT DOCUMENTS

| | | | |
|---|---|---|---|
| 6,102,821 A | 8/2000 | Nakamura | |
| 6,176,798 B1 | 1/2001 | Nakamura | |
| 6,382,381 B1 | 5/2002 | Okajima et al. | |
| 7,131,656 B2 | 11/2006 | Valle | |
| 7,344,463 B2 | 3/2008 | Reiter | |
| 7,585,240 B2 | 9/2009 | Kamada | |
| 8,956,254 B2 | 2/2015 | Tokuyama et al. | |
| 2009/0042679 A1 | 2/2009 | Valle | |
| 2009/0098966 A1 | 4/2009 | Kamada | |
| 2012/0196711 A1 | 8/2012 | Loy et al. | |
| 2017/0057597 A1* | 3/2017 | Tokuyama | B62M 9/10 |

* cited by examiner

*Primary Examiner* — William E Dondero
*Assistant Examiner* — Robert T Reese
(74) *Attorney, Agent, or Firm* — Global IP Counselors, LLP

(57) ABSTRACT

A multiple bicycle sprocket assembly is basically provided with a first sprocket supporting member and a second sprocket supporting member. A first sprocket is coupled to one of a first bicycle inbound facing side and a first bicycle outbound facing side of the first sprocket supporting member, and is a separate member therefrom. A second sprocket is coupled to one of a second bicycle inbound facing side and a second bicycle outbound facing side of the second sprocket supporting member, and is a separate member therefrom. At least one fastening member connects the first sprocket supporting member and the second sprocket supporting member, and is a separate member therefrom. At least one hub engaged sprocket is free from connection with the at least one fastening member, and is a separate member from the first and second sprocket supporting members.

21 Claims, 9 Drawing Sheets

MULTIPLE BICYCLE SPROCKET ASSEMBLY

BACKGROUND

Field of the Invention

This invention generally relates to a multiple bicycle sprocket assembly. More specifically, the present invention relates to a multiple bicycle sprocket assembly in which two or more sprockets can be mounted to a bicycle hub using a sprocket supporting member.

Background Information

Most bicycles utilize a chain drive transmission in which a chain is moved between a plurality of front sprockets and a plurality of rear sprockets to change gears. In recent years, bicycle component manufacturers have been manufacturing bicycle transmissions that have more available speeds to the rider. As the available speeds in the bicycle transmission increases, the number of sprockets installed on the rear wheel also usually increases. Accordingly, various attempts have been made in order to increase the maximum number of sprockets that can be installed on a rear hub assembly. For example, some multiple sprocket assemblies use a spider (sprocket supporting member), which supports a plurality of ring-shaped sprocket wheels on a freewheel of a rear hub. In order to reduce an overall weight of the multiple sprocket assembly that uses a spider, a light metal, such as aluminum, etc., is generally used for the spider, while various types of steel materials are used for the sprockets to provide adequate strength. One example of a multiple sprocket assembly that uses a spider is disclosed in U.S. Pat. No. 6,382,381 (assigned to Shimano Inc.).

SUMMARY

Generally, the present disclosure is directed to various features of a multiple bicycle sprocket assembly having a pair of sprocket supporting members for supporting two or more sprockets.

In view of the state of the known technology and in accordance with a first aspect of the present disclosure, a multiple bicycle sprocket assembly is basically provided that includes a first sprocket supporting member and a second sprocket supporting member. The first sprocket supporting member includes a first sprocket mounting portion and a first hub engagement portion. The first sprocket mounting portion has a first bicycle inbound facing side and a first bicycle outbound facing side opposite to the first bicycle inbound facing side in an axial direction parallel to a rotational center axis of the multiple bicycle sprocket assembly. The second sprocket supporting member includes a second sprocket mounting portion and a second hub engagement portion. The second sprocket mounting portion has a second bicycle inbound facing side and a second bicycle outbound facing side opposite to the second bicycle inbound facing side in the axial direction. A first sprocket includes a first sprocket body and a plurality of first sprocket teeth extending radially outwardly from the first sprocket body with respect to the rotational center axis. The first sprocket is a separate member from the first sprocket supporting member. The first sprocket body is coupled to one of the first bicycle inbound facing side of the first sprocket mounting portion and the first bicycle outbound facing side of the first sprocket mounting portion. A second sprocket includes a second sprocket body and a plurality of second sprocket teeth extending radially outwardly from the second sprocket body with respect to the rotational center axis. The second sprocket is a separate member from the second sprocket supporting member. The second sprocket body is coupled to one of the second bicycle inbound facing side of the second sprocket mounting portion and the second bicycle outbound facing side of the second sprocket mounting portion. At least one hub engaged sprocket includes a sprocket-hub engagement portion, a hub engaged sprocket body extending radially outwardly from the sprocket-hub engagement portion and a plurality of hub engaged sprocket teeth extending radially outwardly from the hub engaged sprocket body with respect to the rotational center axis. The at least one hub engaged sprocket is a separate member from the first and second sprocket supporting members. At least one fastening member connects the first sprocket supporting member and the second sprocket supporting member. The at least one fastening member is a separate member from the first sprocket supporting member and the second sprocket supporting member. The at least one hub engaged sprocket is free from connection with the fastening member.

With the multiple bicycle sprocket assembly according to the first aspect, the pedaling torque is transmitted through both the at least one fastening member to the first sprocket supporting member and through the second hub engagement portion of the second sprocket supporting member, thereby allowing an axial thickness of the first and second sprocket supporting members to be reduced.

In accordance with a second aspect of the present invention, the multiple bicycle sprocket assembly according to the first aspect is configured so that a third sprocket includes a third sprocket body and a plurality of third sprocket teeth extending radially outwardly from the third sprocket body with respect to the rotational center axis. The third sprocket is a separate member from the first sprocket supporting member. The third sprocket body is coupled to the other of the first bicycle inbound facing side of the first sprocket mounting portion and the first bicycle outbound facing side of the first sprocket mounting portion.

In accordance with a third aspect of the present invention, the multiple bicycle sprocket assembly according to the second aspect is configured so that a fourth sprocket includes a fourth sprocket body and a plurality of fourth sprocket teeth extending radially outwardly from the fourth sprocket body with respect to the rotational center axis. The fourth sprocket is a separate member from the second sprocket supporting member. The fourth sprocket body is coupled to the other of the second bicycle inbound facing side of the second sprocket mounting portion and the second bicycle outbound facing side of the second sprocket mounting portion.

In accordance with a fourth aspect of the present invention, the multiple bicycle sprocket assembly according to any one of the first to third aspects is configured so that the at least one fastening member is disposed radially outwardly from the first hub engagement portion and the second hub engagement portion.

In accordance with a fifth aspect of the present invention, the multiple bicycle sprocket assembly according to the fourth aspect is configured so that the at least one fastening member is spaced apart from the first hub engagement portion and the second hub engagement portion.

In accordance with a sixth aspect of the present invention, the multiple bicycle sprocket assembly according to any one of the second to fifth aspects is configured so that the first sprocket and the third sprocket are coupled to the first sprocket mounting portion of the first sprocket supporting member by the at least one fastening member.

In accordance with a seventh aspect of the present invention, the multiple bicycle sprocket assembly according to any one of the second to sixth aspects is configured so that the first sprocket and the third sprocket are coupled to the first sprocket mounting portion of the first sprocket supporting member by at least one first fastener.

In accordance with an eighth aspect of the present invention, the multiple bicycle sprocket assembly according to the seventh aspect is configured so that the at least one fastening member is disposed radially inwardly from the at least one first fastener.

In accordance with a ninth aspect of the present invention, the multiple bicycle sprocket assembly according to any one of the third to eighth aspects is configured so that the second sprocket and the fourth sprocket are coupled to the second sprocket mounting portion of the second sprocket supporting member by at least one second fastener.

In accordance with a tenth aspect of the present invention, the multiple bicycle sprocket assembly according to the ninth aspect is configured so that the at least one fastening member is disposed radially inwardly from the at least one second fastener.

In accordance with an eleventh aspect of the present invention, the multiple bicycle sprocket assembly according to any one of the first to tenth aspects is configured so that the at least one fastening member has a space maintaining portion to maintain an axial space between the first sprocket supporting member and the second sprocket supporting member.

In accordance with a twelfth aspect of the present invention, the multiple bicycle sprocket assembly according to the eleventh aspect is configured so that the space maintaining portion is an integral part of the at least one fastening member.

In accordance with a thirteenth aspect of the present invention, the multiple bicycle sprocket assembly according to the eleventh or twelfth aspect is configured so that the at least one fastening member has a shaft portion and that the space maintaining portion is a separate member from the shaft portion and mounted on the shaft portion.

In accordance with a fourteenth aspect of the present invention, the multiple bicycle sprocket assembly according to any one of the first to thirteenth aspects is configured so that the at least one fastening member is made of a metallic material.

In accordance with a fifteenth aspect of the present invention, the multiple bicycle sprocket assembly according to the fourteenth aspect is configured so that the at least one fastening member includes a rivet.

In accordance with a sixteenth aspect of the present invention, the multiple bicycle sprocket assembly according to any one of the first to sixteenth aspects is configured so that a spacer to maintain axial space between the first sprocket supporting member and the second sprocket supporting member is provided.

In accordance with a seventeenth aspect of the present invention, the multiple bicycle sprocket assembly according to the sixteenth aspect is configured so that the spacer has a hub engagement portion.

In accordance with an eighteenth aspect of the present invention, the multiple bicycle sprocket assembly according to the sixteenth or seventeenth aspect is configured so that the at least one fastening member is disposed radially outwardly from the spacer.

In accordance with a nineteenth aspect of the present invention, the multiple bicycle sprocket assembly according to any one of the first to eighteenth aspects is configured so that the at least one fastening member includes a plurality of the fastening members spaced circumferentially about the rotational center axis.

In accordance with a twentieth aspect of the present invention, the multiple bicycle sprocket assembly according to the seventh or eighth aspect is configured so that the at least one first fastener includes a plurality of first fasteners spaced circumferentially about the rotational center axis.

In accordance with a twenty-first aspect of the present invention, the multiple bicycle sprocket assembly according to the ninth or tenth aspect is configured so that the at least one second fastener includes a plurality of second fasteners spaced circumferentially about the rotational center axis.

Also other objects, features, aspects and advantages of the disclosed multiple bicycle sprocket assembly will become apparent to those skilled in the art from the following detailed description, which, taken in conjunction with the annexed drawings, discloses two embodiments of the multiple bicycle sprocket assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a multiple bicycle sprocket assembly 10 in accordance with the present invention can have fewer or more sprockets.

Figure 1:
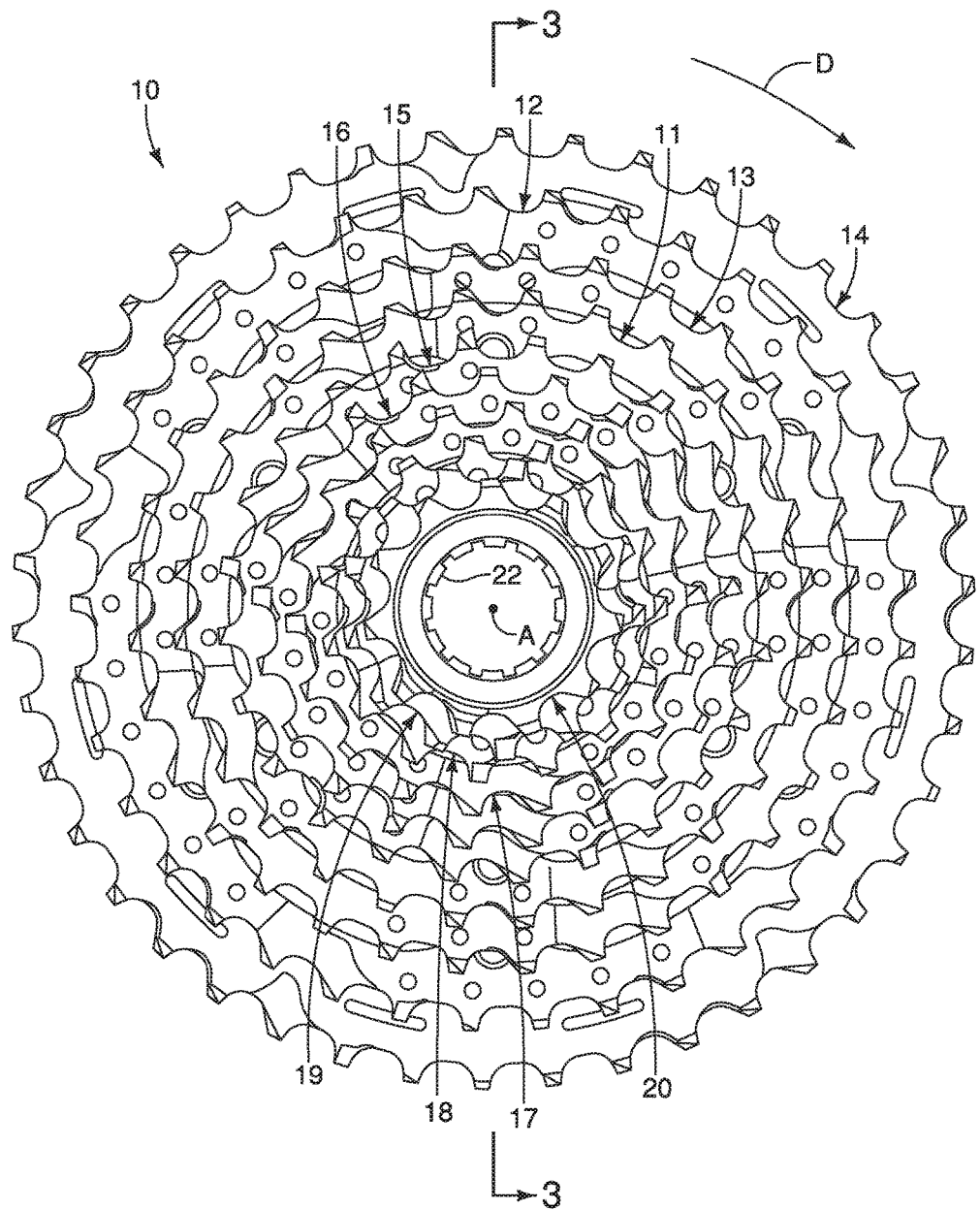
FIG. 1 is an outbound side elevational view of a multiple (ten-stage) bicycle sprocket assembly in accordance with one illustrated embodiment.
Figure 2:
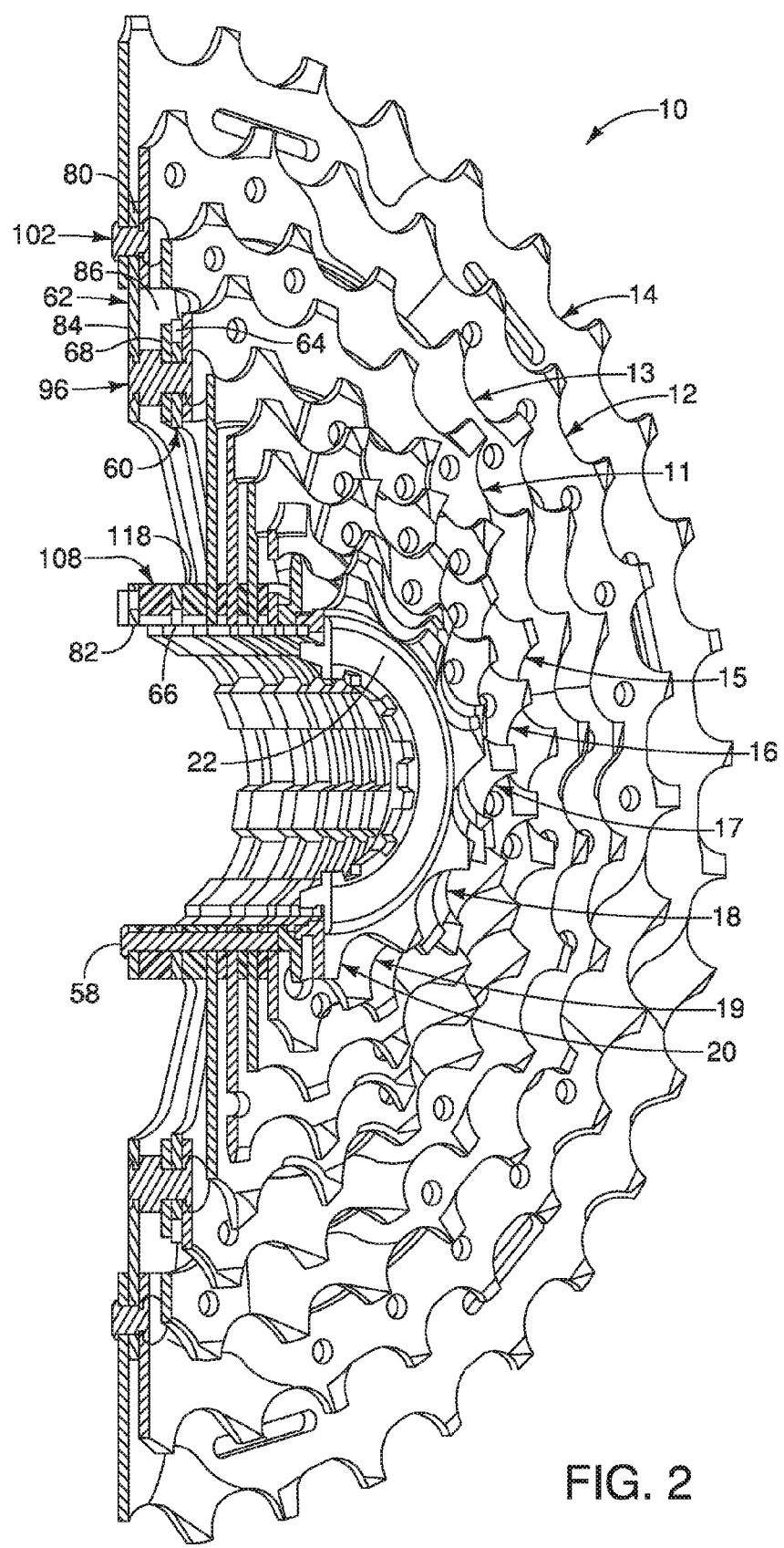
FIG. 2 is a perspective view of the multiple bicycle sprocket assembly with a portion broken away.
Figure 3:
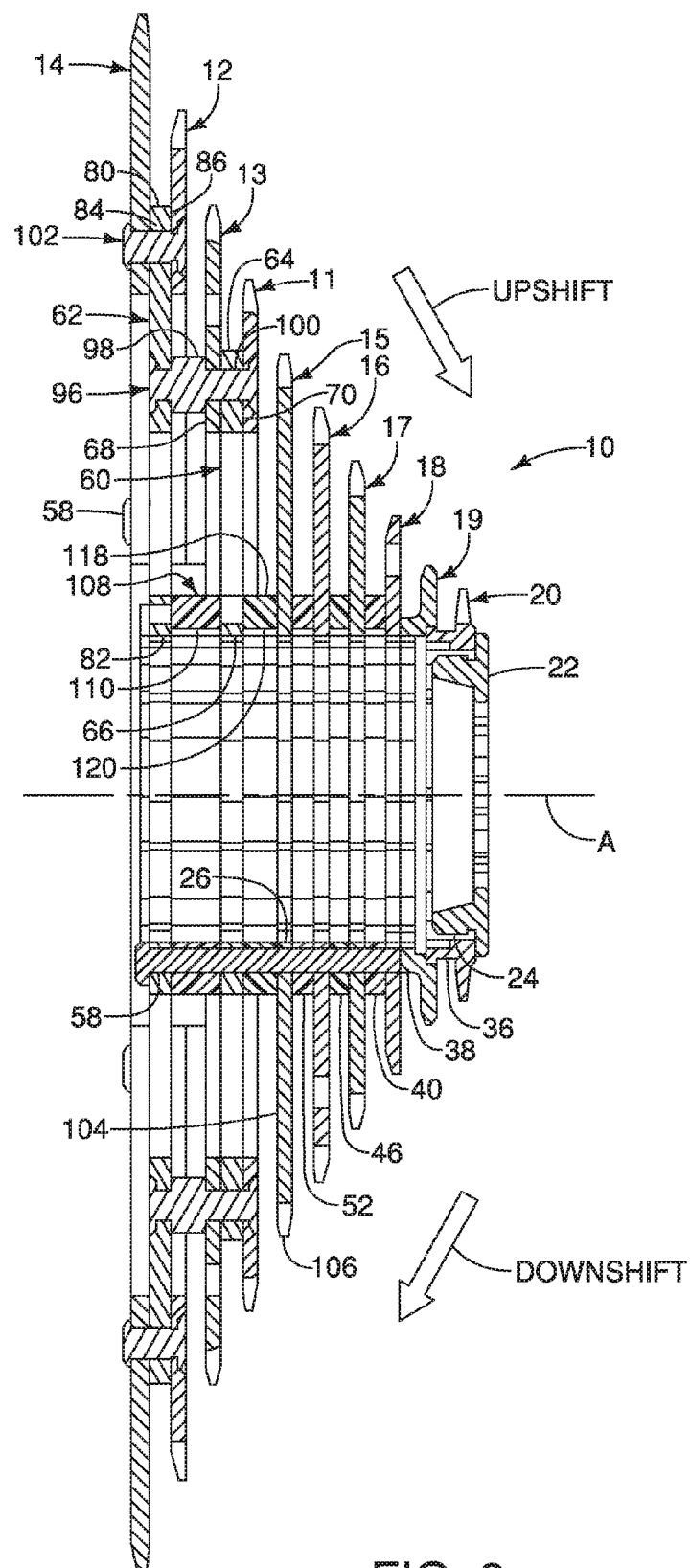
FIG. 3 is a cross sectional view of the multiple bicycle sprocket assembly as seen along section line 3-3 of FIG. 1.

Referring initially to FIGS. 1 to 3, a multiple bicycle sprocket assembly 10 is illustrated in accordance with a first exemplary embodiment of the present invention. In the illustrated exemplary embodiment, the multiple bicycle sprocket assembly 10 includes at least a first sprocket 11 and a second sprocket 12. As shown in this exemplary embodiment, a third sprocket 13 is disposed between the first sprocket 11 and the second sprocket 12, and a fourth sprocket 14 is disposed adjacent the second sprocket 12 on an opposite side from the third sprocket 13.

As shown in FIGS. 1 to 3, the sprocket assembly 10 includes ten sprockets 11-20. The fifth through tenth sprockets 15-20 are disposed in a bicycle outbound direction of the first sprocket 11. The sprockets 11-20 are axially spaced from each other at predetermined intervals. The sprockets 15-20 are configured to be fixedly mounted on a freewheel (not shown) of a rear hub (not shown). The sprockets 11-20 are configured to rotate together about a rotational center axis A. The sprockets 11-20 typically rotate together in a forward rotational direction D (e.g., in a clockwise direction as viewed in FIG. 1) when the rider is pedaling in a forward (clockwise) direction to propel the bicycle in a forward direction.

As shown in FIGS. 1 to 3, the sprockets 11 to 20 are hard, rigid disc shaped members formed from a suitable material, such as a metallic material. In the illustrated exemplary embodiment, the sprockets 11 to 20 are each a one-piece, unitary member formed of a metallic material that is suitable for a bicycle sprocket. Referring to FIG. 3, the sprocket assembly 10 is illustrated in partial cross-section with arrows showing the directions of an upshift operation and a downshift operation. An upshift operation occurs when the chain is moved from a large sprocket to the next smaller sprocket, while a downshift operation occurs when the chain is shifted from a small sprocket to the next larger sprocket. The sprockets 11 to 20 are designed so that the chain can execute smooth downshifting and upshifting motions. The sprockets 11-20 can include modified teeth, such as teeth having inclined surfaces, and/or recesses to facilitate the downshifting and upshifting operations.

As shown in FIGS. 1 to 3, the sprockets 11-20 are secured on the freewheel of the rear hub with a lock ring 22. An outer peripheral surface 24 of the lock ring is preferably threaded, as shown in FIG. 4, to engage a threaded surface of the freewheel (not shown), thereby securing the sprocket assembly 10 to the rear hub (not shown).

Figure 4:
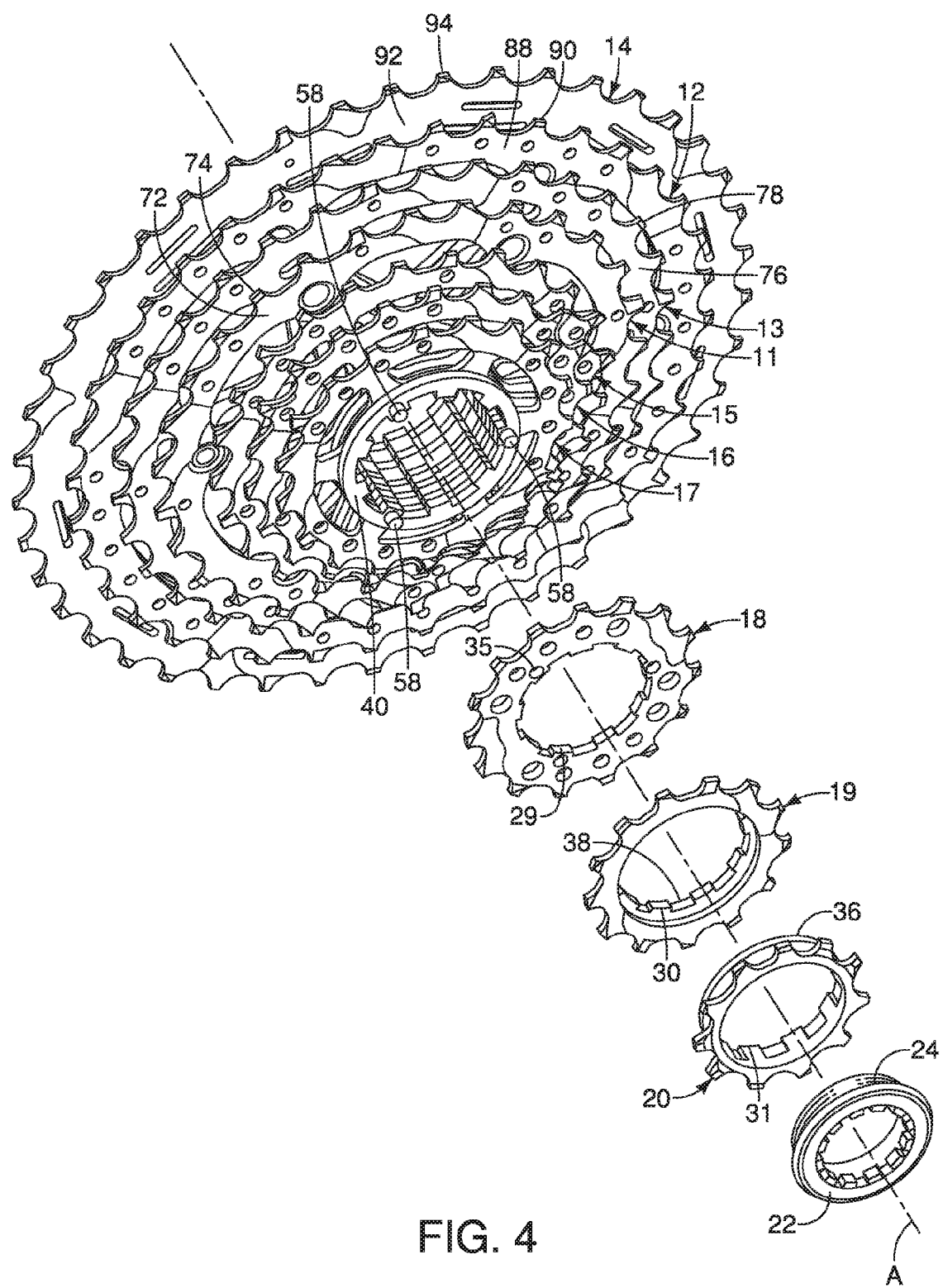
FIG. 4 is a partial exploded perspective view of the multiple bicycle sprocket assembly illustrated in FIGS. 1 to 3.
Figure 5:
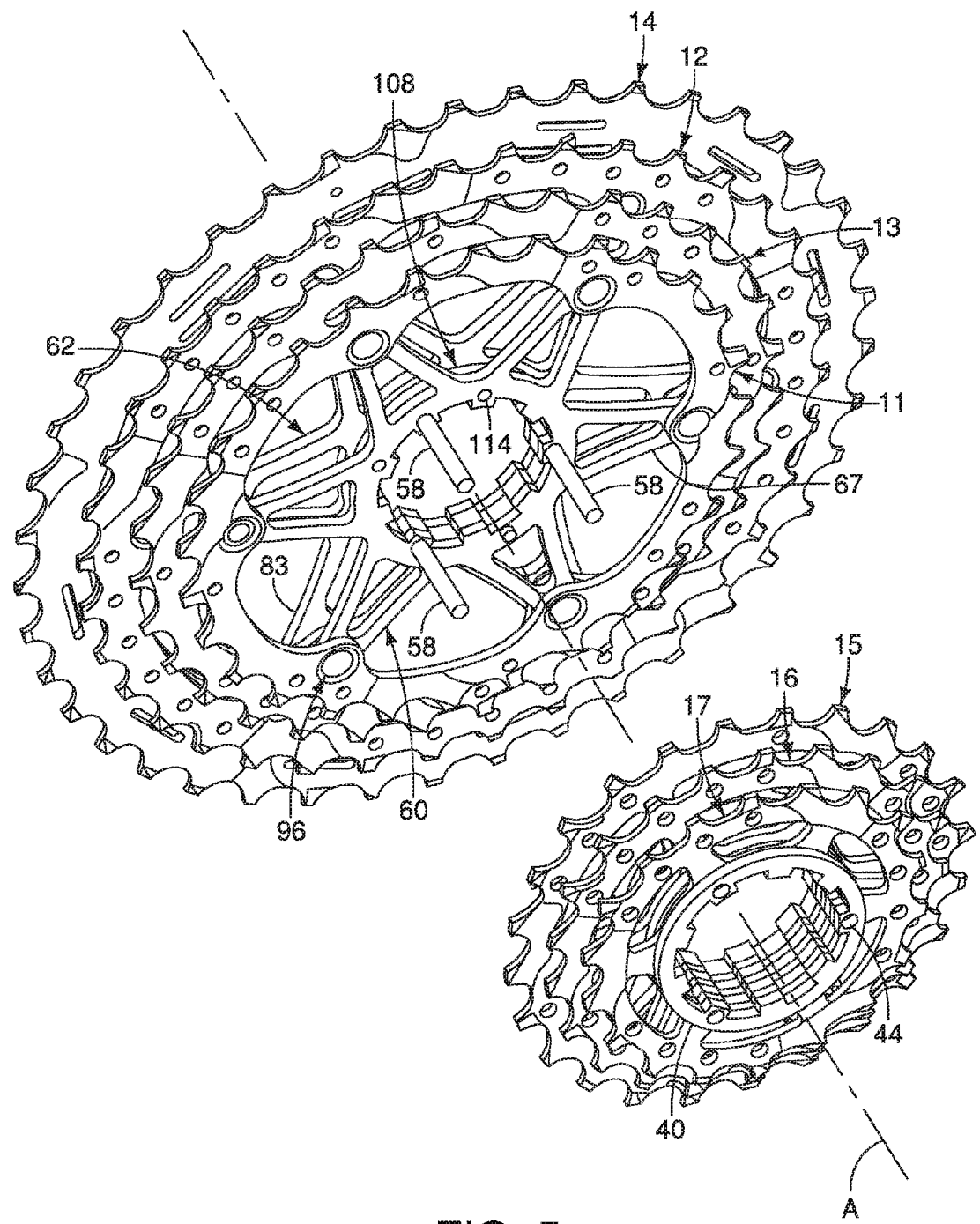
FIG. 5 is a partial exploded perspective view of selected sprockets of the multiple bicycle sprocket assembly illustrated in FIGS. 1 to 4.
Figure 6:
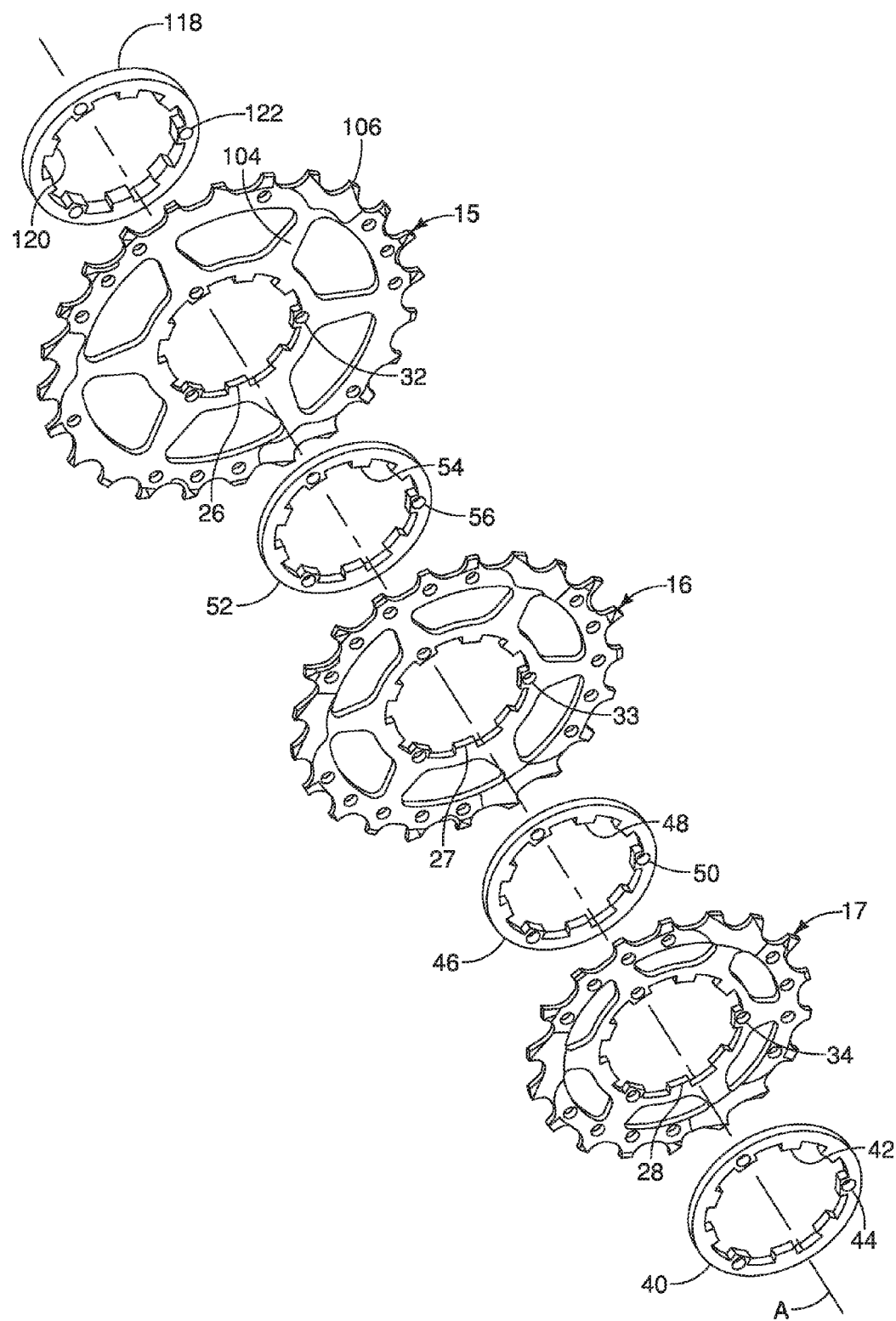
FIG. 6 is a partial exploded perspective view of selected sprockets of the multiple bicycle sprocket assembly illustrated in FIGS. 1 to 4.

Each of the sprockets 15 to 20 has a sprocket-hub engagement portion 26 to 31 configured to be directly fixedly mounted on the freewheel of the rear hub, as shown in FIGS. 4 to 6, thereby non-rotatably engaging each of the sprockets 15 to 20 with the freewheel. Each of the sprockets 15 to 18 has at least one fastener opening 32 to 35 disposed in a sprocket body thereof, as shown in FIGS. 4 and 6.

The sprocket 20 includes an integral axial spacing portion 36, as shown in FIGS. 3 and 4, to maintain axial space between the sprocket 20 and the sprocket 19. The sprocket 19 includes an integral axial spacing portion 38 to maintain axial space between the sprocket 19 and the sprocket 18.

A spacer 40, as shown in FIGS. 3, 4 and 6, is disposed on the freewheel of the rear hub. The spacer 40 is provided between the sprocket 18 and the sprocket 17 to maintain axial space between the sprockets 18 and 17. The spacer 40 includes a hub engagement portion 42 configured to be directly fixedly mounted on the freewheel, thereby non-rotatably engaging the spacer 40 with the freewheel of the rear hub. The spacer 40 includes at least one fastener opening 44.

A spacer 46, as shown in FIG. 6, is disposed on the freewheel of the rear hub. The spacer 46 is provided between the sprocket 17 and the sprocket 16 to maintain axial space between the sprockets 17 and 16. The spacer 46 includes a hub engagement portion 48 configured to be directly fixedly mounted on the freewheel of the rear hub, thereby non-rotatably engaging the spacer 46 with the freewheel of the rear hub. The spacer 46 includes at least one fastener opening 50.

A spacer 52, as shown in FIG. 6, is disposed on the freewheel of the rear hub. The spacer 52 is provided between the sprocket 16 and the sprocket 15 to maintain axial space between the sprockets 16 and 15. The spacer 52 includes a hub engagement portion 54 configured to be directly fixedly mounted on the freewheel of the rear hub, thereby non-rotatably engaging the spacer 52 on the freewheel of the rear hub. The spacer 52 includes at least one fastener opening 56.

The sprockets 15 to 18 and the spacers 40, 46 and 52 are secured together by a fastener 58, as shown in FIGS. 2 to 4. The fastener 58 is received by the at least one fastener openings 32 to 35 in the sprockets 15 to 18 and by the at least one fastener openings 44, 50 and 56 in the spacers 40, 46 and 52. As shown in FIG. 4, three fasteners 58 are used, although any suitable number of fasteners can be used.

A first sprocket supporting member 60 and a second sprocket supporting member 62 further receive the fastener 58 to form an integral unit, as shown in FIGS. 2 and 3. The first and second sprocket supporting members 60 and 62 are directly fixedly mounted on the freewheel of the rear hub. The first supporting member 60 supports the first and third sprockets 11 and 13 on the freewheel of the rear hub. Accordingly, the first and third sprockets 11 and 13 are free from directly contacting the freewheel of the rear hub. The second supporting member 62 supports the second and fourth sprockets 12 and 14 on the freewheel of the rear hub. Accordingly, the second and fourth sprockets 12 and 14 are free from directly contacting the freewheel of the rear hub.

Figure 7:
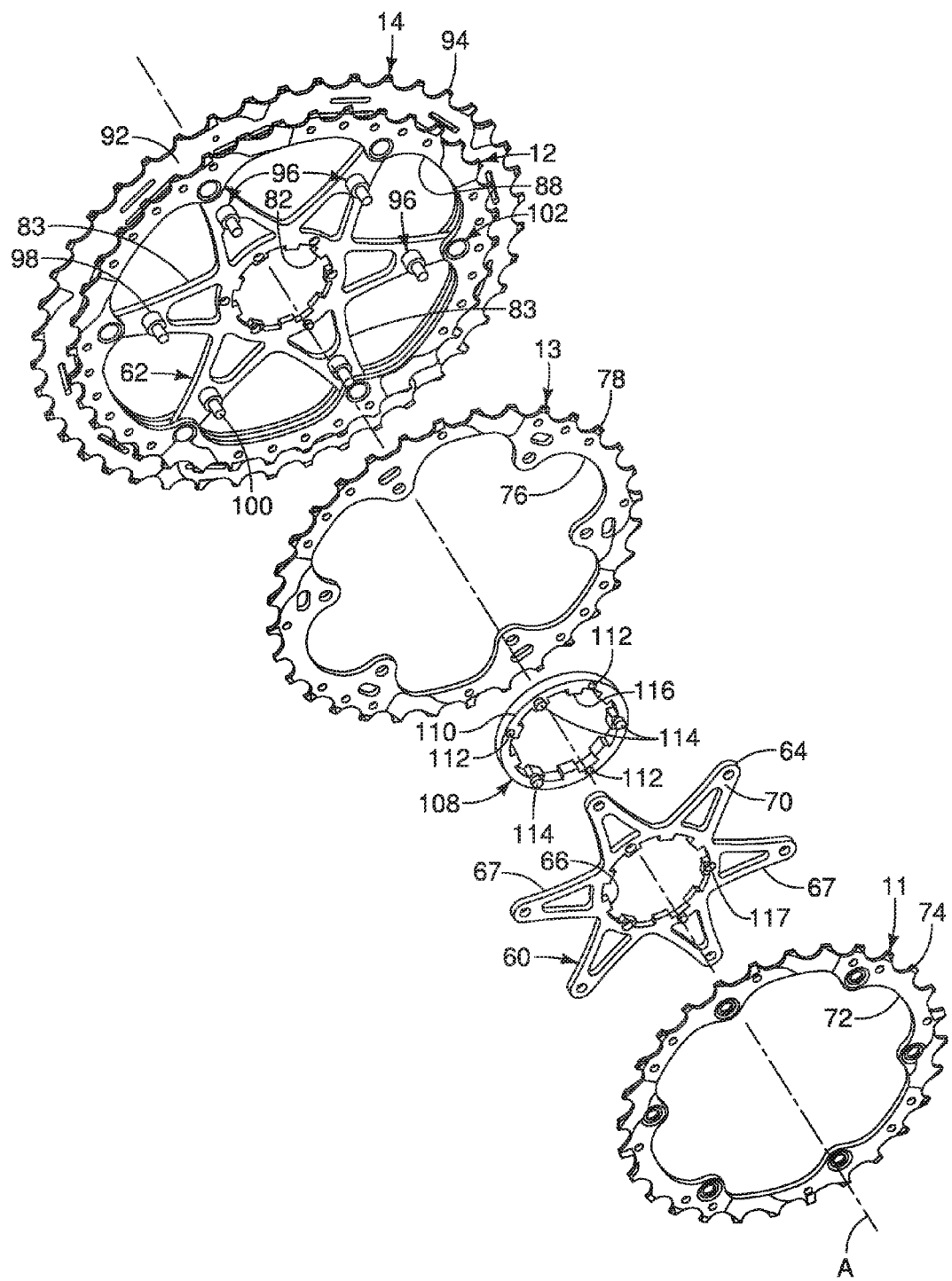
FIG. 7 is a partial exploded perspective view of selected sprockets of the multiple bicycle sprocket assembly illustrated in FIGS. 1 to 4.

The first sprocket supporting member 60 includes a first sprocket mounting portion 64 and a first hub engagement portion 66, as shown in FIGS. 3 and 7. The first sprocket mounting portion 64 includes a plurality of arms 67 radially extending from the first hub engagement portion 66. As shown in FIG. 5, the first sprocket mounting portion 64 includes six arms 67, although any suitable number can be used. The first sprocket mounting portion 64 has a first bicycle inbound facing side 68 and a first bicycle outbound facing side 70 opposite to the first bicycle inbound facing side 68 in an axial direction parallel to the rotational center axis A of the multiple bicycle sprocket assembly 10. The first sprocket 11 and the third sprocket 13 are coupled to the first sprocket mounting portion 64. The first hub engagement portion 68 non-rotatably engages the freewheel of the rear hub such that the first supporting member 60 rotates with the freewheel of the rear hub.

The first sprocket 11 includes a first sprocket body 72 and a plurality of first sprocket teeth 74 extending radially outwardly from the first sprocket body 72 with respect to the rotational center axis A, as shown in FIG. 7. The first sprocket 11 is a separate member from the first sprocket supporting member 60. The first sprocket body 72 is coupled to one of the first bicycle inbound facing side 68 of the first sprocket mounting portion 64 and the first bicycle outbound facing side 70 of the first sprocket mounting portion 64. As shown in FIGS. 3 and 7, the first sprocket body 72 is coupled to the first bicycle outbound facing side 70 of the first sprocket mounting portion 64.

The third sprocket 13 includes a third sprocket body 76 and a plurality of third sprocket teeth 78 extending radially outwardly from the third sprocket body 76 with respect to the rotational center axis A, as shown in FIG. 7. The third sprocket 13 is a separate member from the first sprocket supporting member 60. The third sprocket body 76 is coupled to the other of the first bicycle inbound facing side 68 of the first sprocket mounting portion 64 and the first bicycle outbound facing side 70 of the first sprocket mounting portion 64. As shown in FIGS. 3 and 7, the third sprocket body 76 is coupled to the first bicycle inbound facing side 68 of the first sprocket mounting portion 64.

Figure 8:
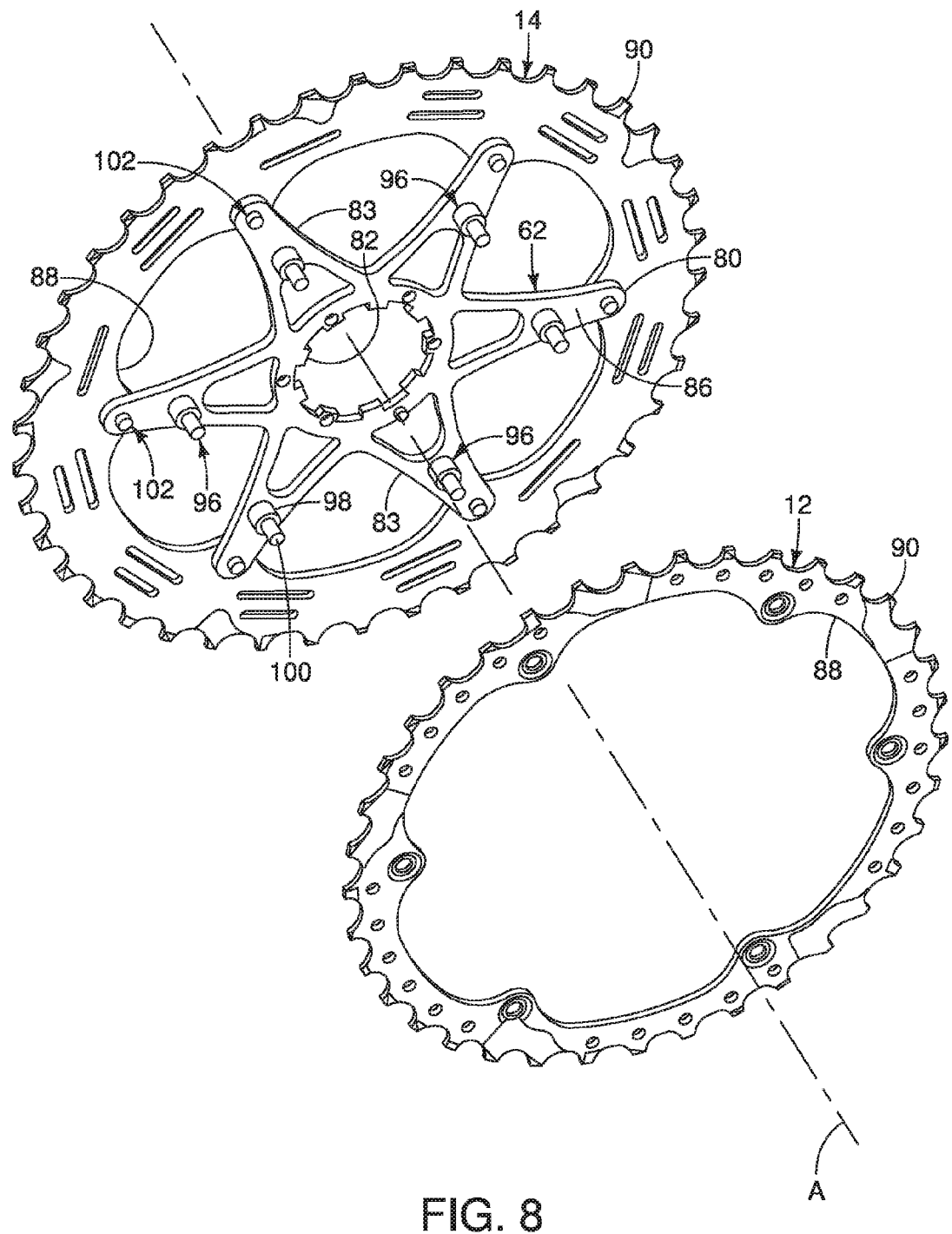
FIG. 8 is a partial exploded perspective view of selected sprockets of the multiple bicycle sprocket assembly illustrated in FIGS. 1 to 4.

The second sprocket supporting member 62 includes a second sprocket mounting portion 80 and a second hub engagement portion 82, as shown in FIGS. 3, 7 and 8. The second sprocket mounting portion 80 includes a plurality of arms 83 radially extending from the second hub engagement portion 82. As shown in FIG. 8, the second sprocket mounting portion 80 includes six arms 83, although any suitable number can be used. As shown in FIGS. 7 and 8, the first and second sprocket supporting members 60 and 62 have substantially similarly shapes, except that the second sprocket supporting member 62 extends further radially from the rotational center axis A than the first sprocket supporting member 60. The second sprocket mounting portion 80 has a second bicycle inbound facing side 84 and a second bicycle outbound facing side 86 opposite to the second bicycle inbound facing side 84 in the axial direction, which is parallel to the rotational center axis A of the multiple bicycle sprocket assembly 10. The second and fourth sprockets 12 and 14 are fixed to the second sprocket mounting portion 80. The second hub engagement portion 82 non-rotatably engages the freewheel of the rear hub such that the second supporting member 62 rotates with the freewheel of the rear hub.

The second sprocket 12 includes a second sprocket body 88 and a plurality of second sprocket teeth 90 extending radially outwardly from the second sprocket body 88 with respect to the rotational center axis A. The second sprocket 12 is a separate member from the second sprocket supporting member 62. The second sprocket body 88 is coupled to one of the second bicycle inbound facing side 84 of the second sprocket mounting portion 80 and the second bicycle outbound facing side 86 of the second sprocket mounting portion 80. As shown in FIGS. 3 and 8, the second sprocket body 88 is coupled to the second bicycle outbound facing side 86 of the second sprocket mounting portion 80.

The fourth sprocket 14 includes a fourth sprocket body 92 and a plurality of fourth sprocket teeth 94 extending radially outwardly from the fourth sprocket body 92 with respect to the rotational center axis A, as shown in FIGS. 3 and 8. The fourth sprocket 14 is a separate member from the second sprocket supporting member 62. The fourth sprocket body 92 is coupled to the other of the second bicycle inbound facing side 84 of the second sprocket mounting portion 80 and the second bicycle outbound facing side 86 of the second sprocket mounting portion 80. As shown in FIGS. 3 and 8, the fourth sprocket body 92 is coupled to the second bicycle inbound facing side 84 of the second sprocket mounting portion 80.

At least one fastening member 96 connects the first sprocket supporting member 60 and the second sprocket supporting member 62, as shown in FIGS. 3, 7 and 8. The at least one fastening member 96 is a separate member from the first sprocket supporting member 60 and the second sprocket supporting member 62. The fastening member 96 can be made from any suitable material, such as the fastening member being made of a metallic material. The fastening member 96 can be any suitable fastener, such as the fastening member including a rivet. As shown in FIGS. 7 and 8, a plurality of fastening members 96 are spaced circumferentially about the rotational center axis A. Although six fastening members 96 are illustrated, any suitable number of fastening members can be used. Pedaling torque is transmitted through both the at least one fastening member 96 to the first sprocket supporting member 60 and through the second hub engagement portion 82 of the second sprocket supporting member 62, thereby allowing an axial thickness of the first and second sprocket supporting members 60 and 62 to be reduced.

The at least one fastening member 96 is disposed radially outwardly from the first hub engagement portion 66 and the second hub engagement portion 82 of the first and second sprocket supporting members 60 and 62, respectively, as shown in FIGS. 3 and 7, thereby facilitating transmission of the pedaling torque to the freewheel of the rear hub. The at least one fastening member 96 is spaced apart from the first hub engagement portion 66 and the second hub engagement portion 82.

As shown in FIGS. 7 and 8, the fastening member 96 has a space maintaining portion 98 to maintain an axial space between the first sprocket supporting member 60 and the second sprocket supporting member 62, thereby providing the appropriate axial spacing between the sprockets coupled to the first and second sprocket supporting members 60 and 62. Preferably, the space maintaining portion 98 is an integral part of the fastening member 96. The fastening member 96, as shown in FIGS. 7 and 8, includes a shaft portion 100. The shaft portion 100 can be integrally formed with the space maintaining portion 98 as a single member. Alternatively, the space maintaining portion 98 is a separate member from the shaft portion 100 and mounted on the shaft portion 100. When the space maintaining portion 98 is a separate member from the shaft portion 100, the space maintaining portion 98 is secured to the shaft portion 100 in any suitable manner.

As shown in FIGS. 3 and 7, the first sprocket 11 and the third sprocket 13 are coupled to the first sprocket mounting portion 64 of the first sprocket supporting member 60 by the at least one fastening member 96, thereby rigidly coupling the first and third sprockets 11 and 13 to the first sprocket supporting member 60. The at least one fastening member 96 connects the first and second sprocket supporting members 60 and 62 to the first sprocket supporting member 60 such that the first and third sprockets 11 and 13 rotate with the first sprocket supporting member 60.

As shown in FIGS. 3, 7 and 8, the second sprocket 12 and the fourth sprocket 14 are coupled to the second sprocket mounting portion 80 of the second sprocket supporting member 62 by at least one fastener 102, thereby rigidly coupling the second and fourth sprockets 12 and 14 to the second sprocket supporting member 62. The at least one fastener 102 connects the second and fourth sprockets 12 and 14 to the second sprocket supporting member 62 such that the second and fourth sprockets 12 and 14 rotate with the second sprocket supporting member 62. The fastening member 96 is disposed radially inwardly from the at least one fastener 102 to facilitate transmission of pedaling torque from the second sprocket supporting member 62 to the first sprocket supporting member 60. A plurality of fasteners 102 are spaced circumferentially about the rotational center axis A. Although six fasteners 102 are illustrated, any suitable number of fasteners can be used.

As shown in FIG. 3, at least one hub engaged sprocket includes a sprocket-hub engagement portion, a hub engaged sprocket body extending radially outwardly from the sprocket-hub engagement portion and a plurality of hub engaged sprocket teeth extending radially outwardly from the hub engaged sprocket body with respect to the rotational center axis A. The at least one hub engaged sprocket is a separate member from the first and second sprocket supporting members 60 and 62. The at least one hub engaged sprocket is free from connection with the fastening member 96. Accordingly, pedaling torque is transmitted from the at least one hub engaged sprocket to the freewheel of the rear hub without passing through the first or second sprocket supporting members 60 and 62. For example, the sprocket 15 includes the hub engagement portion 26 that engages the freewheel of the rear hub. A hub engaged sprocket body 104 of the sprocket 15 extends radially outwardly from the sprocket-hub engagement portion 26. A plurality of hub engaged sprocket teeth 106 extend radially outwardly from the hub engaged sprocket body 104 with respect to the rotational center axis A. The sprocket 15 is a separate member from the first and second sprocket supporting members 60 and 62. The sprocket 15 is free from connection with the fastening member 96. The sprockets 16 to 20 are similarly configured as sprocket 15 as hub engaged sprockets.

A spacer 108 maintains axial space between the first sprocket supporting member 60 and the second sprocket supporting member 62, as shown in FIGS. 2, 3 and 7, thereby providing the appropriate axial spacing between the sprockets coupled to the first and second sprocket supporting members. The spacer 108 is disposed axially between the first sprocket supporting member 60 and the second sprocket supporting member 62. The spacer 108 has a hub engagement portion 110 configured to non-rotatably engage the freewheel of the rear hub. The fastening member 96 is disposed radially outwardly from the spacer 108, as shown in FIGS. 2 and 7. The spacer 108 includes at least one fastener opening 112 and at least one projection 114. The fastener opening 112 extends entirely through the spacer 108 in the axial direction. The projection 114 extends in the axial direction from a bicycle outbound facing side 116 of the spacer 108. The projections 114 are received by fastener openings 117 in the first hub engagement portion 66 of the first sprocket supporting member 60.

As shown in FIGS. 2, 3 and 6, an additional spacer 118 maintains axial space between the sprocket 15 and the first sprocket supporting member 60. The spacer 118 includes a hub engagement portion 120 configured to non-rotatably engage the freewheel of the rear hub. The spacer 118 includes at least one fastener opening 122 configured to receive the fastener 58.

Figure 9:
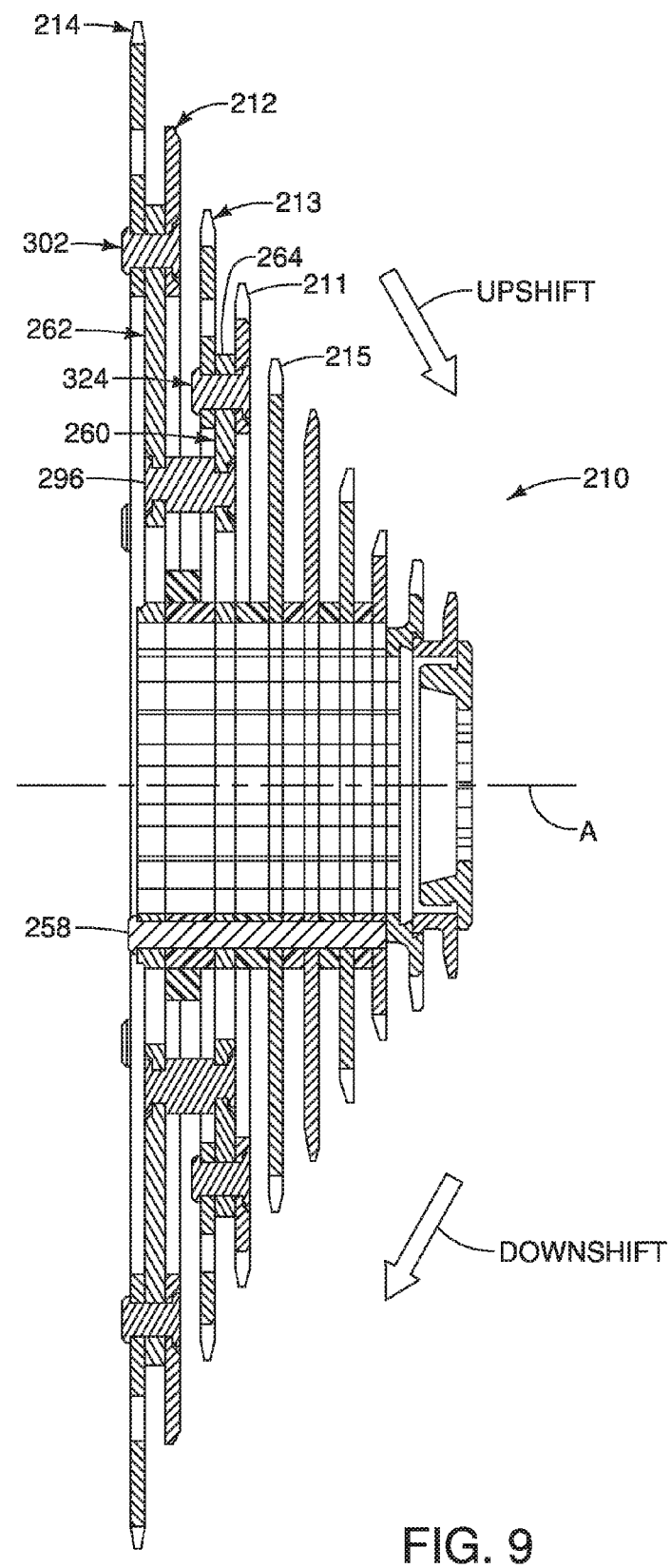
FIG. 9 is a cross sectional view, similar to FIG. 3, of an alternative multiple (ten-stage) bicycle sprocket assembly in accordance with another illustrated embodiment.

As shown in FIG. 9, a multiple bicycle sprocket assembly 210 in accordance with a second exemplary embodiment of the present invention is substantially similar to the multiple bicycle sprocket assembly 10 of the first exemplary embodiment except for the differences described below. Similar parts are identified with similar reference numerals, except increased by 200 (i.e., 2xx or 3xx, accordingly).

The first sprocket supporting member 260 and the second sprocket supporting member 262 are coupled by the at least one fastening member 296. The at least one fastener 302 couples the second sprocket 212 and the fourth sprocket 214 to the second sprocket supporting member 262. Pedaling torque is transmitted through both the at least one fastening member 296 to the first sprocket supporting member 260 and through the second sprocket supporting member 262, thereby allowing an axial thickness of the first and second sprocket supporting members 260 and 262 to be reduced.

The first sprocket 211 and the third sprocket 213 are coupled to the first sprocket mounting portion 264 of the first sprocket supporting member 260 by at least one fastener 324. The at least one fastening member 296 is disposed radially inwardly from the at least one fastener 324. The at least one fastener 324 includes a plurality of fasteners spaced circumferentially about the rotational center axis A. The at least one fastener 324 coupling the first and third sprockets 211 and 213 is disposed radially inwardly from the fastener 302 coupling the second and fourth sprockets 212 and 214. The at least one fastening member 296 is disposed radially inwardly from the at least one fastener 302 and the at least one fastener 324, thereby facilitating transmission of the pedaling torque from one of the sprocket supporting members through the other sprocket supporting member. As shown in FIG. 9, the first and third sprockets 211 and 213 are free from connection with the at least one fastening member 296.

Although shown in FIGS. 1 to 9 as a rear sprocket assembly, the multiple bicycle sprocket assembly in accordance with the exemplary embodiments of the present invention is equally applicable to a front sprocket assembly.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the multiple bicycle sprocket assembly. Accordingly, these directional terms, as utilized to describe the multiple bicycle sprocket assembly should be interpreted relative to a bicycle in an upright riding position on a horizontal surface and that is equipped with the multiple bicycle sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multiple bicycle sprocket assembly comprising:
    a first sprocket supporting member including a first sprocket mounting portion and a first hub engagement portion, the first sprocket mounting portion having a first bicycle inbound facing side and a first bicycle outbound facing side opposite to the first bicycle inbound facing side in an axial direction parallel to a rotational center axis of the multiple bicycle sprocket assembly;
    a second sprocket supporting member including a second sprocket mounting portion and a second hub engagement portion, the second sprocket mounting portion having a second bicycle inbound facing side and a second bicycle outbound facing side opposite to the second bicycle inbound facing side in the axial direction;
    a first sprocket including a first sprocket body and a plurality of first sprocket teeth extending radially outwardly from the first sprocket body with respect to the rotational center axis, the first sprocket being a separate member from the first sprocket supporting member, the first sprocket body being coupled to one of the first bicycle inbound facing side of the first sprocket mounting portion and the bicycle outbound facing side of the first sprocket mounting portion;
    a second sprocket including a second sprocket body and a plurality of second sprocket teeth extending radially outwardly from the second sprocket body with respect to the rotational center axis, the second sprocket being a separate member from the second sprocket supporting member, the second sprocket body being coupled to one of the second bicycle inbound facing side of the second sprocket mounting portion and the second bicycle outbound facing side of the second sprocket mounting portion;
    at least one hub engaged sprocket including a sprocket-hub engagement portion, a hub engaged sprocket body extending radially outwardly from the sprocket-hub engagement portion and a plurality of hub engaged sprocket teeth extending radially outwardly from the hub engaged sprocket body with respect to the rotational center axis, the at least one hub engaged sprocket being a separate member from the first and second sprocket supporting members; and
    at least one fastening member connecting the first sprocket supporting member and the second sprocket supporting member, the at least one fastening member being a separate member from the first sprocket supporting member and the second sprocket supporting member, and the at least one hub engaged sprocket being free from connection with the fastening member.

2. The multiple bicycle sprocket assembly according to claim 1, further comprising
    a third sprocket including a third sprocket body and a plurality of third sprocket teeth extending radially outwardly from the third sprocket body with respect to the rotational center axis, the third sprocket being a separate member from the first sprocket supporting member, the third sprocket body being coupled to the other of the first bicycle inbound facing side of the first sprocket mounting portion and the first bicycle outbound facing side of the first sprocket mounting portion.

3. The multiple bicycle sprocket assembly according to claim 2, further comprising
    a fourth sprocket including a fourth sprocket body and a plurality of fourth sprocket teeth extending radially outwardly from the fourth sprocket body with respect to the rotational center axis, the fourth sprocket being a separate member from the second sprocket supporting member, the fourth sprocket body being coupled to the other of the second bicycle inbound facing side of the second sprocket mounting portion and the second bicycle outbound facing side of the second sprocket mounting portion.

4. The multiple bicycle sprocket assembly according to claim 3, wherein
    the second sprocket and the fourth sprocket are coupled to the second sprocket mounting portion of the second sprocket supporting member by at least one second fastener.

5. The multiple bicycle sprocket assembly according to claim 4, wherein
    the at least one fastening member is disposed radially inwardly from the at least one second fastener.

6. The multiple bicycle sprocket assembly according to claim 4, wherein
    the at least one second fastener includes a plurality of second fasteners spaced circumferentially about the rotational center axis.

7. The multiple bicycle sprocket assembly according to claim 2, wherein
    the first sprocket and the third sprocket are coupled to the first sprocket mounting portion of the first sprocket supporting member by the at least one fastening member.

8. The multiple bicycle sprocket assembly according to claim 2, wherein
the first sprocket and the third sprocket are coupled to the first sprocket mounting portion of the first sprocket supporting member by at least one first fastener.

9. The multiple bicycle sprocket assembly according to claim 8, wherein
the at least one fastening member is disposed radially inwardly from the at least one first fastener.

10. The multiple bicycle sprocket assembly according to claim 8, wherein
the at least one first fastener includes a plurality of first fasteners spaced circumferentially about the rotational center axis.

11. The multiple bicycle sprocket assembly according to claim 1, wherein
the at least one fastening member is disposed radially outwardly from the first hub engagement portion and the second hub engagement portion.

12. The multiple bicycle sprocket assembly according to claim 11, wherein
the at least one fastening member is spaced apart from the first hub engagement portion and the second hub engagement portion.

13. The multiple bicycle sprocket assembly according to claim 1, wherein
the at least one fastening member has a space maintaining portion to maintain an axial space between the first sprocket supporting member and the second sprocket supporting member.

14. The multiple bicycle sprocket assembly according to claim 13, wherein
the space maintaining portion is an integral part of the at least one fastening member.

15. The multiple bicycle sprocket assembly according to claim 13, wherein
the at least one fastening member has a shaft portion; and
the space maintaining portion is a separate member from the shaft portion and mounted on the shaft portion.

16. The multiple bicycle sprocket assembly according to claim 1, wherein
the at least one fastening member is made of a metallic material.

17. The multiple bicycle sprocket assembly according to claim 16, wherein
the at least one fastening member includes a rivet.

18. The multiple bicycle sprocket assembly according to claim 1, further comprising
a spacer to maintain axial space between the first sprocket supporting member and the second sprocket supporting member.

19. The multiple bicycle sprocket assembly according to claim 18, wherein
the spacer has a hub engagement portion.

20. The multiple bicycle sprocket assembly according to claim 18, wherein
the at least one fastening member is disposed radially outwardly from the spacer.

21. The multiple bicycle sprocket assembly according to claim 1, wherein
the at least one fastening member includes a plurality of the fastening members spaced circumferentially about the rotational center axis.

* * * * *